J. A. MARKOE.
STAMP AFFIXER MACHINE.
APPLICATION FILED FEB. 13, 1911.

1,035,619.

Patented Aug. 13, 1912.
7 SHEETS—SHEET 1.

Witnesses
H. C. Poluietto
E. H. Bickerton

Inventor
John A. Markoe
By Meyers, Cushman & Rea
Attorneys

J. A. MARKOE.
STAMP AFFIXER MACHINE.
APPLICATION FILED FEB. 13, 1911.

1,035,619.

Patented Aug. 13, 1912.

7 SHEETS—SHEET 4.

Witnesses
H. C. Robinette
E. H. Bickerton

Inventor
John A. Markoe

By Meyers Cushman & Rea
Attorneys

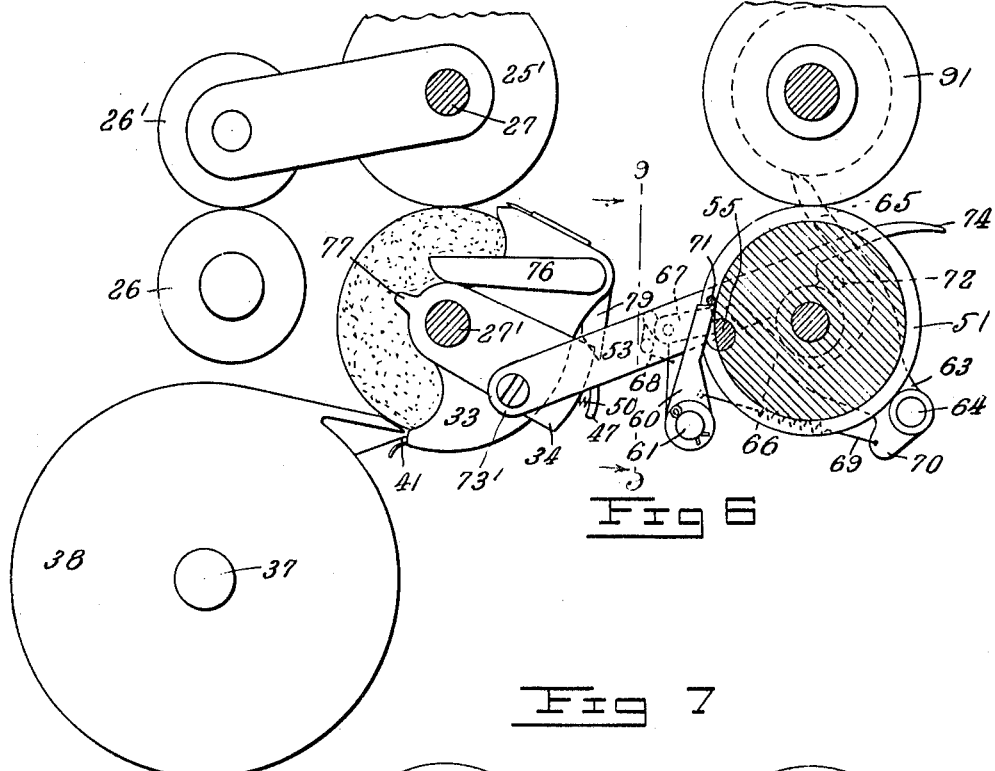
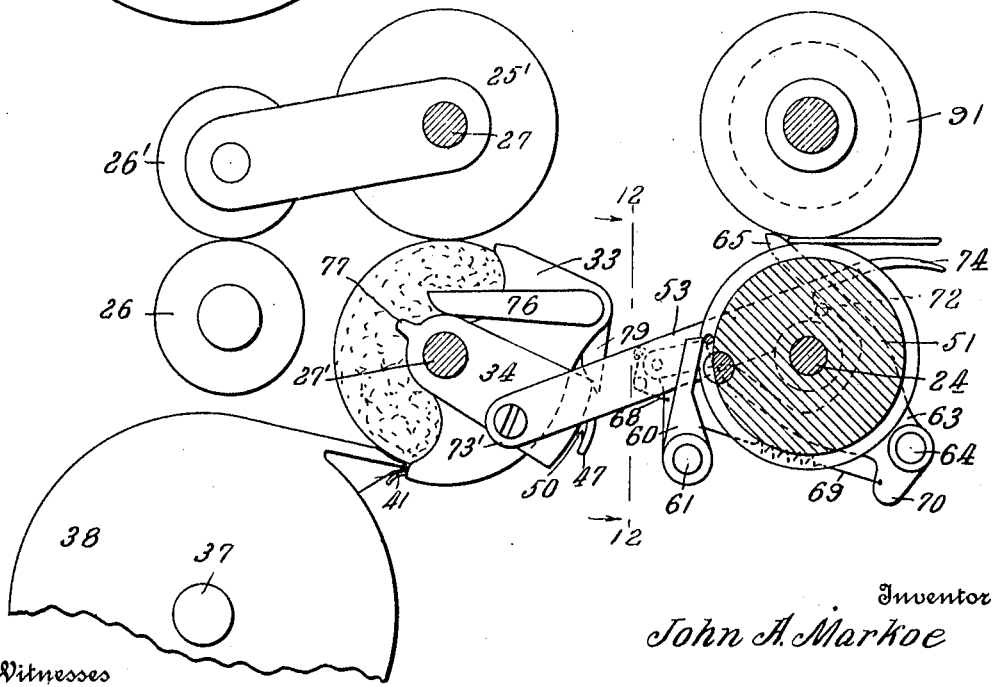

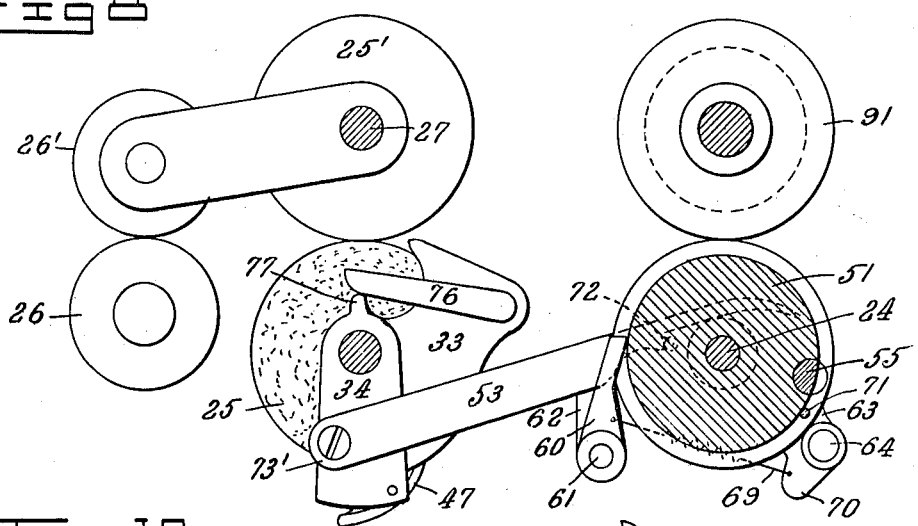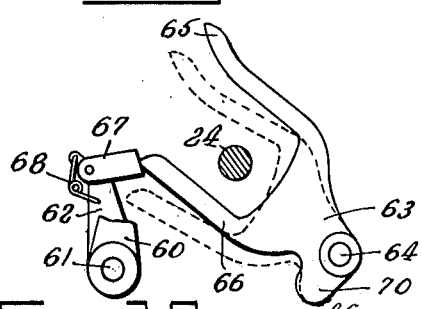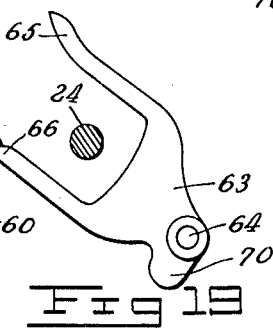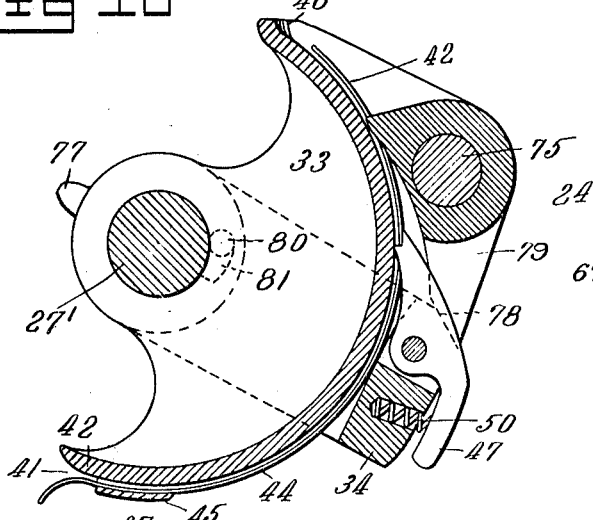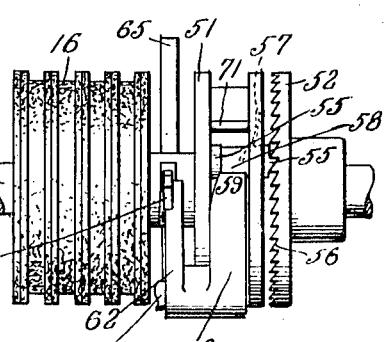

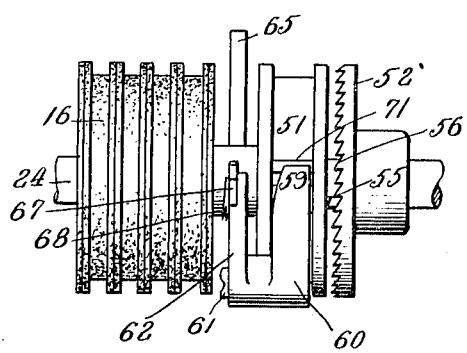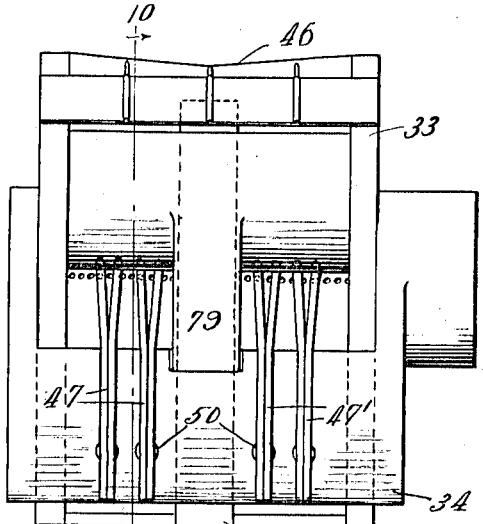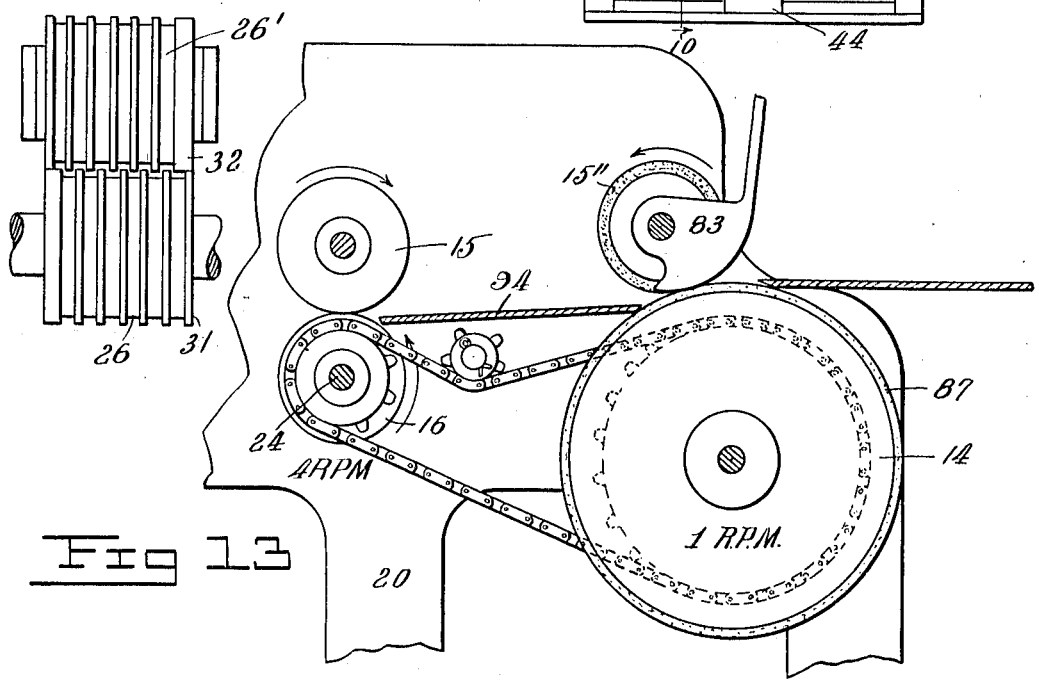

UNITED STATES PATENT OFFICE.

JOHN A. MARKOE, OF ST. PAUL, MINNESOTA.

STAMP-AFFIXER MACHINE.

1,035,619.

Specification of Letters Patent.  Patented Aug. 13, 1912.

Application filed February 13, 1911. Serial No. 608,424.

*To all whom it may concern:*

Be it known that I, JOHN A. MARKOE, a citizen of the United States, residing at St. Paul, in the county of Ramsey and State of Minnesota, have invented new and useful Improvements in Stamp-Affixer Machines, of which the following is a specification.

The aims of my invention have been to produce an efficient, speedy and reliable stamp affixer.

The efficiency of machines of this type have been greatly impaired owing to the difficulties in feeding the stamps. Owing to the inequalities in the sizes of the stamps and the irregularities in the perforations between them, the reliability of the feeding mechanism of the stamp affixer has been very difficult to secure.

I have succeeded in producing a machine which gives entirely reliable operation at a very high rate of speed, the rated speed of the machine I have built being one hundred and fifty packets per minute.

I show one embodiment of my invention in the accompanying drawings.

Figure 1:
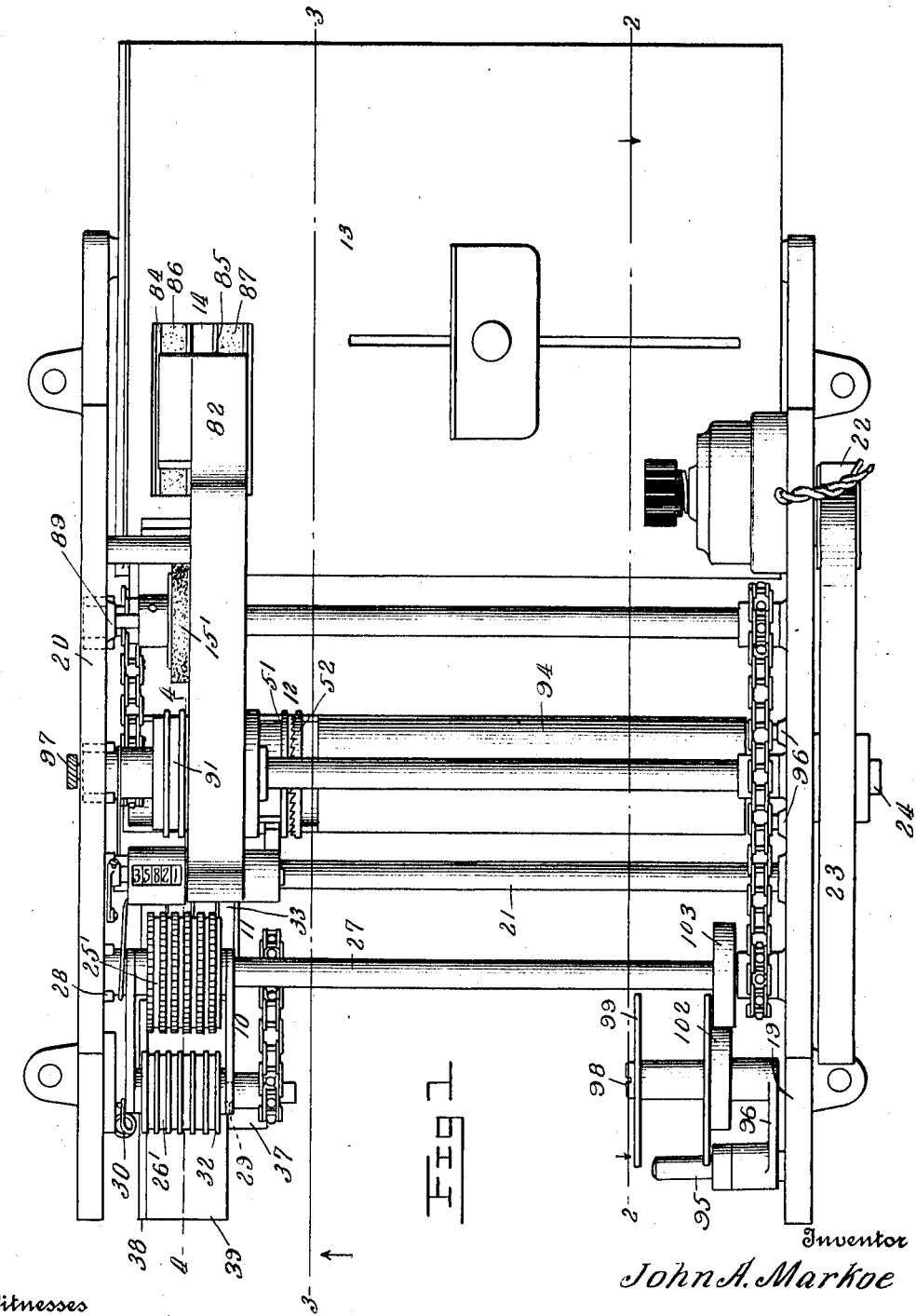
Figure 2:
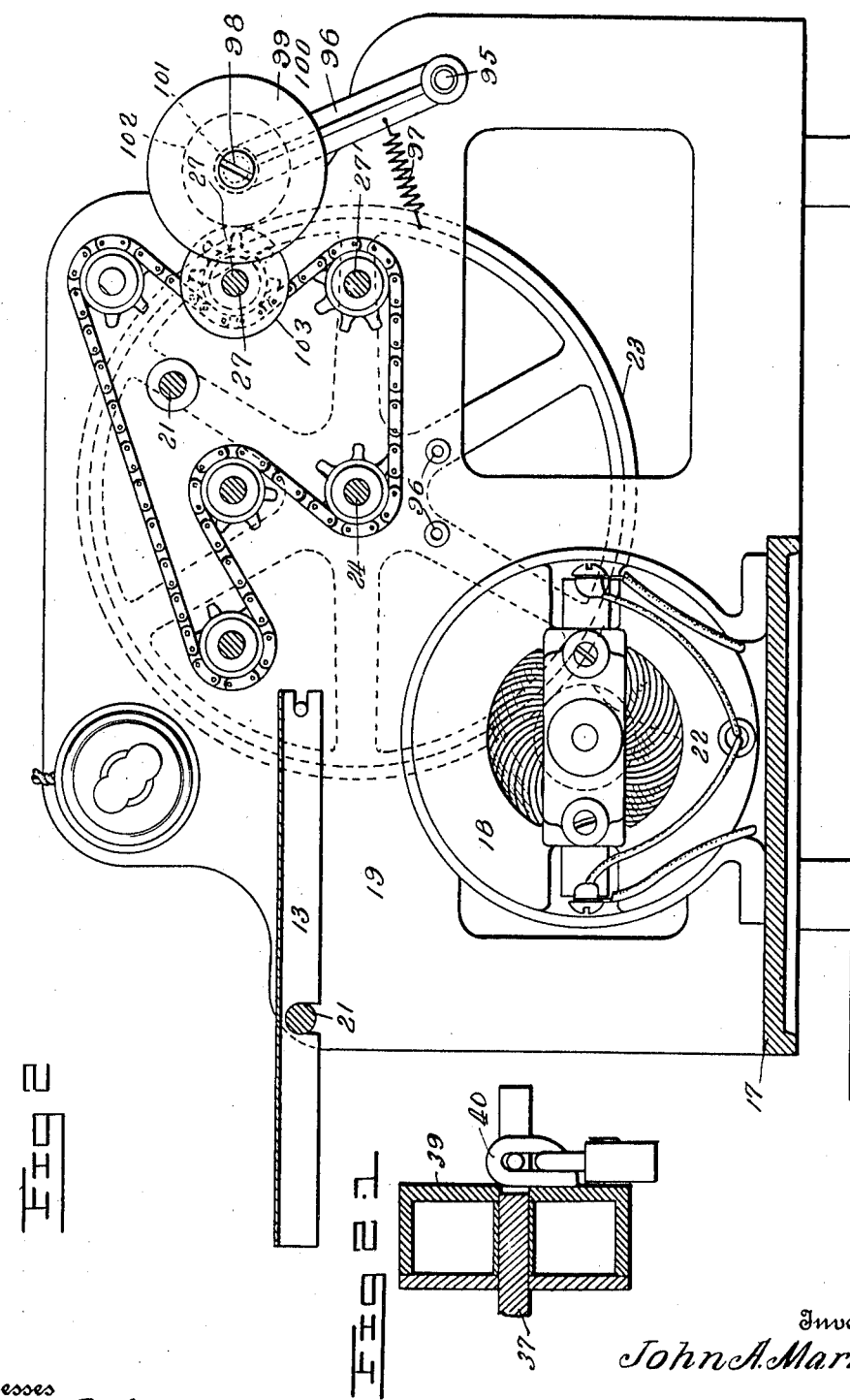
Figure 3:
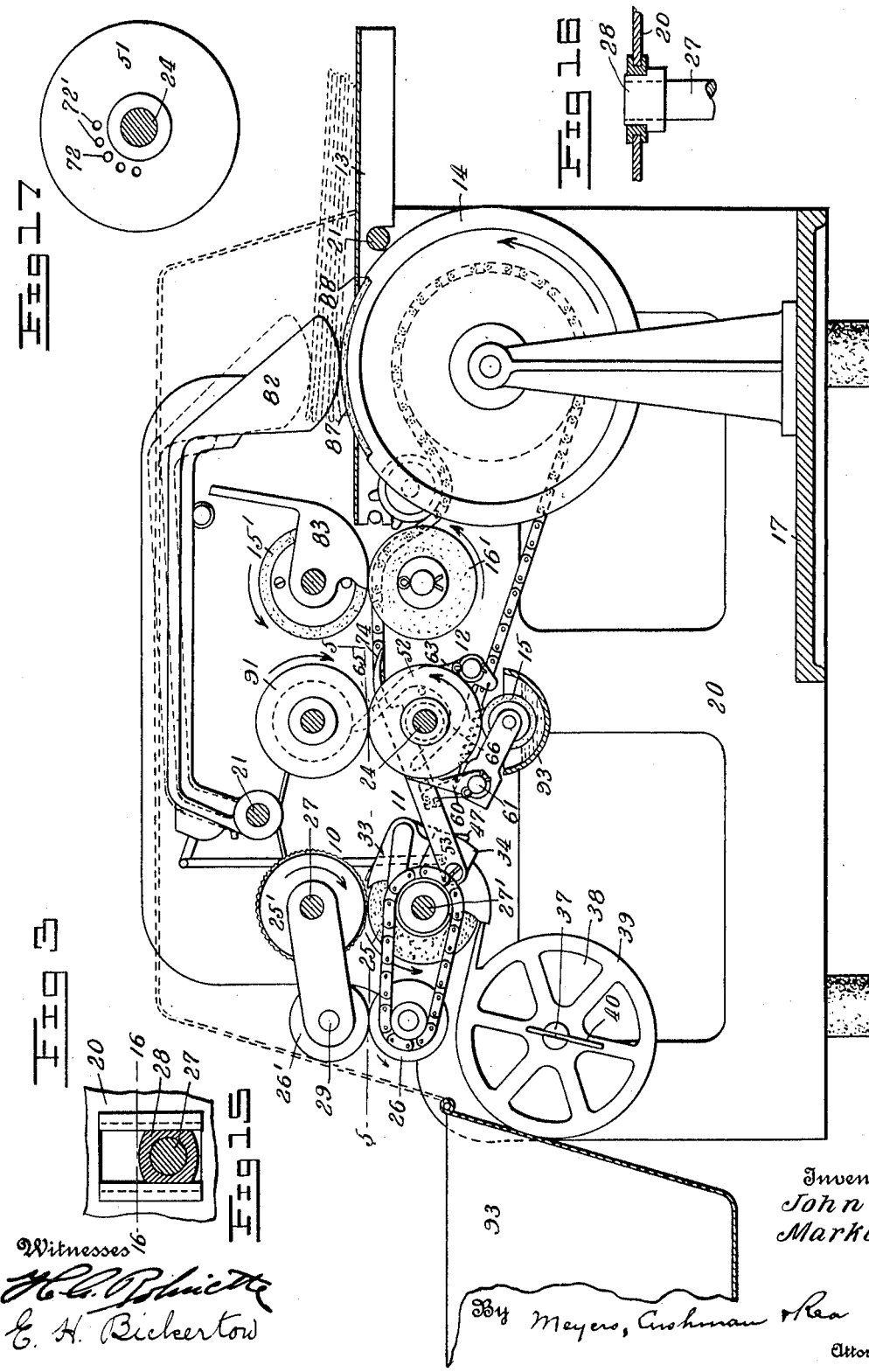
Figure 4:
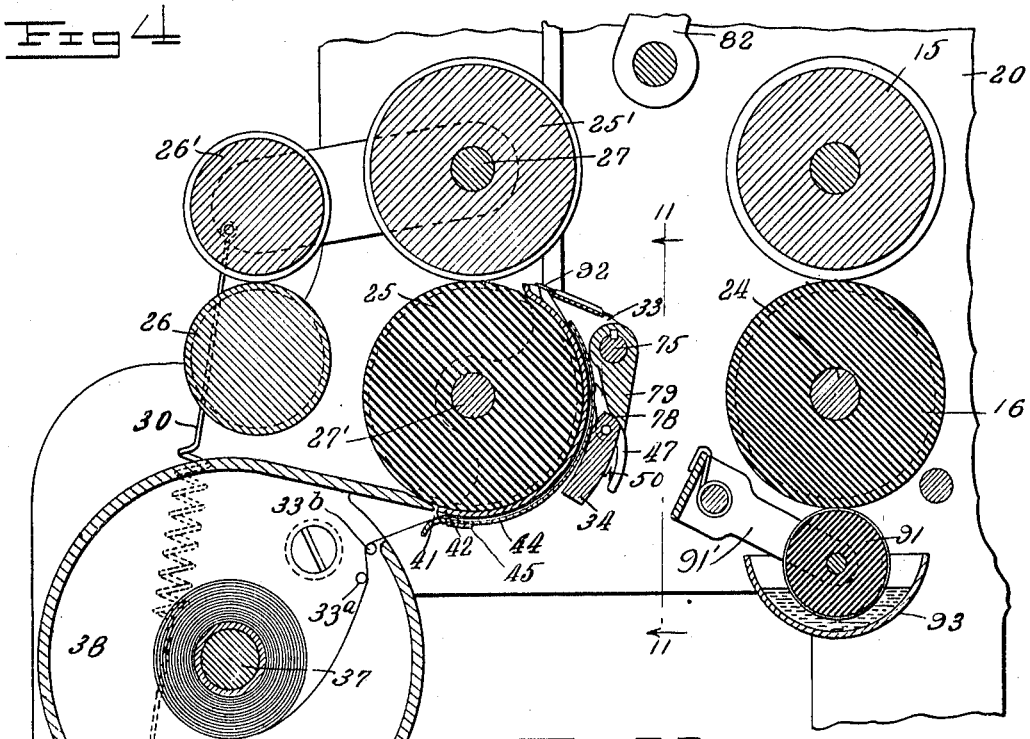
Figure 20:
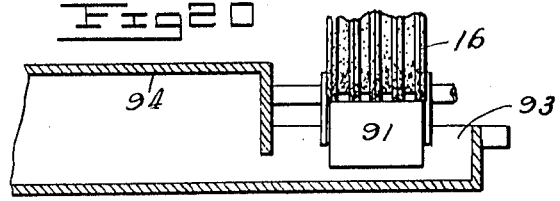
Figure 5:
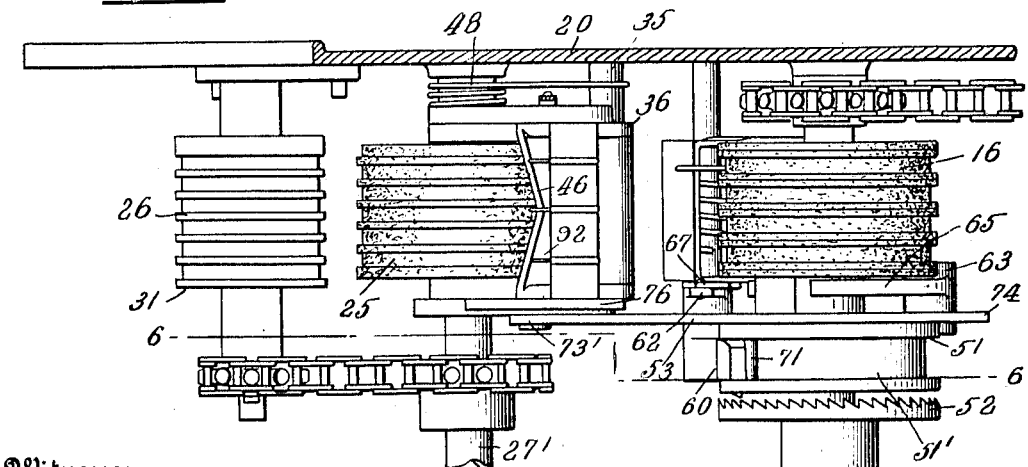

Of the drawings:—Figure 1 is a general plan view. Fig. 2 is a vertical section on the line 2—2 of Fig. 1. Fig. 3 is a sectional view on the line 3—3 of Fig. 1 looking in the direction of the arrow. Fig. 4 is a section through the mechanism of the machine on the line 4—4 of Fig. 1. Fig. 5 is an enlarged plan view of the stamp applying and feeding mechanisms, on the line 5—5 of Fig. 3. Fig. 6 is a section on the line 6—6 of Fig. 5 showing the mechanism of Fig. 5 in elevation and parts in normal positions. Fig. 7 is a similar section of the mechanism of Fig. 5, showing the parts in another position, the feeding mechanism about to be actuated. Fig. 8 is a view similar to Fig. 6 showing the feeding mechanism as it is about to feed a stamp forward. Fig. 9 is a side elevation on the line 9—9 of Fig. 6 showing the positions of the actuating devices as they are in Fig. 6. Fig. 10 is an enlarged section of portion of the feeding mechanism on line 10—10 of Fig. 11, the feed roll being omitted. Fig. 11 is a front elevation of the feeding mechanism on line 11—11 of Fig. 4 in the direction of the arrows. Fig. 12 is a side elevation similar to Fig. 9 taken on line 12—12 of Fig. 7 showing the positions of the parts as they are in Fig. 7. Fig. 13 is an elevation of a modified form of feeding mechanism for the machine. Fig. 14 is a front elevation of a pair of applying rolls. Fig. 15 is a face view of the bearing for the adjustable applying roll shaft. Fig. 16 is a section on the line 16—16 of Fig. 15. Fig. 17 is a side elevation of the intermittently moving member and its adjustable abutting pin. Fig. 18 is a detailed side view of the rocking bell-crank lever and its ratchet, showing in full lines the bell-crank lever about to retract the ratchet and in dotted lines the position of the lever after clearing the ratchet. Fig. 19 is a similar view showing the bell-crank lever partly returned to normal position and raising the ratchet. Fig. 20 is a longitudinal central section through the reservoir and its trough, showing the position of the moistening roller in the latter. Fig. 21 is a central view through the stamp roll housing in its locked position upon the supporting stud.

The machine of this embodiment comprises the stamp applying means 10, the stamp feeding means 11, means for actuating it 12, means for feeding the packets to these means comprising a platform 13 and a feed roller mechanism 14, and means for moistening the packet on its way to the applying means comprising the moistening rollers 15 and 16. The entire set of mechanisms in the machine is supported in a light and strong framework comprising a base plate 17, on which a driving motor 18 is mounted, and two side bearing plates 19, 20 connected by rods 21 and bearing operating shafts of the machine. By means of a frictional drive 22, 23 to the main shaft 24 of the machine, the motor drives all of the mechanisms, the several mechanisms being connected to the main shaft by means of chains to be further described.

The stamp applying means consists of two sets of upper and lower applying rollers 25, 25′, 26, 26′; the lower rollers 25, 26 are fixed in position, while the upper rollers are vertically movable, the roll 25′ being carried by shaft 27, the adjacent end of which is journaled in a vertically movable bearing 28, while the roller 26′ is supported from the shaft 27 by a rock shaft 29. The roll 25′ is pressed by its weight to the roll 25, and the roll 26′ is pressed to the roll 26 by a spring 30, but the rolls do not run in contact with each other. The roll 25′ is prevented from contacting with the roll 25 by engagement of the movable bearing 28 with the bottom of its socket in the side plate, and the roll 26' is prevented from engaging the roll 26 by means of the side flanges 31 and 32 on the respective rolls, see Fig. 14, but the surfaces of the rolls are corrugated or ribbed, and the ribs of the upper and lower rolls are staggered with respect to each other, so that the ribs of one roll project between those of the other, and so that a thin packet passed between them will be engaged. The ribs of the main roll 25' are corrugated, while the bottom main roll 25 is made of rubber. It will be seen that these main rolls are adapted to receive the stamp from the feeding means and apply it to a packet as the packet passes between them.

The feeding means is located adjacent the applying means and comprises a fixed feed bed 33 and a reciprocating feed pawl 34 mounted concentric with the lower main applying roll 25 and below the apparent line of contact of the rolls 25, 25'. The feed bed 33 is segmental in shape, extending through about 90° and is fixed in position by a bolt 35 passing through one of the side plates 36, the ends of which are secured to shaft 27'. A stud 37 projecting from the base plate 38 of a roll casing constitutes means for supporting a strip of stamps in roll form.

A housing 39 fitted over the stud 37 and to the plate 38 is adapted to confine a roll of stamps on this stud, the housing 39 being removably held in place by means of a pin and socket latch 40 on the end of the stud 37. This stamp supporting means is below the stamp applying means, and the housing. The adjacent end of the feed bed 33 is provided with an aperture 41, the upper wall of the housing being extended at a tangent to meet the end of the upper wall 42. The end of the strip of stamps is projected through this opening and over the top of the feed bed 33 (see Figs. 4 and 7), and with its upper end in proximity to the applying mechanism. Just in front of the feed bed 33 are two warping pins 33ª and 33ᵇ over which the stamp strip passes as shown in Fig. 4, the advance pin being lower than the rear pin 33ᵇ.

The strip is held flat upon the bed by means of a centrally disposed relatively narrow band of sheet metal 44 extending from one end of the bed to the other and fixed in position very close to the bed, but yet not so close as to exert pressure upon the stamp strip. The rear end of the feed bed is bridged by a bar 45 to which one end of the band 44 is secured and between which and the bottom of the bed the stamp strip is passed. At the upper end of the feed bed, the bed is raised in the middle as at 46 substantially in inverted V shape, the ridge of the raised portion extending at an angle to the line of contact of the applying rolls 25, 25', as clearly shown in Figs. 5 and 11.

The feeding mechanism comprising the feeding device which operates in connection with the feed bed and which comprises the member 34, is a reciprocating feeding device (see Figs. 4, 6 and 7). It consists of an oscillatable pawl 34 mounted to oscillate about the shaft 27'. The pawl is U shaped, the lateral branches of the U being journaled on the shaft 27' on opposite sides of the roll 25, while the base of the U bridges the feed bed. On the base of the U are carried two groups of pawl teeth 47, 47'. The teeth of these groups of pawls 47 and 47' are preferably spaced apart a distance equal to one and one half times the distance between the perforations of the stamp strip. This spacing of the pawls is shown to advantage in Fig. 11 of the drawings. In thus peculiarly arranging the pawls 47 and 47', one pawl of each group will always register with an adjacent perforation of the stamp strip, irregularity in the perforations or a slight lateral play of the strip being thereby permitted without detriment to the feeding action of the pawls. This feeding device 34 is normally pressed upwardly toward the advanced end of the feed bed by means of a spring 48. (Fig. 5). The teeth are pressed toward the bed by means of small springs 50. As should be clear, the pawl is adapted for intermittent reciprocatory movement over the feed bed, and by means of its teeth 47, 47' adapted to engage the stamp strip on its forward or upper stroke and project the same over the feed bed. The pawl teeth have advance extensions 47ª which act to hold the strip down in front and prevent tearing by engaging points 47ᵇ. This intermittent reciprocatory movement is communicated to the feeding pawl by means of the actuating mechanism 12, and the feeding means is governed in its movements to feed one stamp at a time by means of certain complemental devices which I have provided. The actuating means comprises an intermittently rotated clutch member 51, a continuously rotating clutch member 52, and a connecting member 53 between the intermittently moving member 51 and the feeding pawl together with means whereby the actuator is caused to operate the pawl once for every packet which passes through the machine. The intermittently moving member 51 (Figs. 1, 5, 7 and 12) has a peripherally grooved disk loosely mounted on the shaft 24. Transversely of the groove of the member 51 there is provided a clutch bolt 55, one end of which is spaced to engage with the teeth 56 on the adjacent side of the continuously rotating disk 52, the bolt being pressed by means of spring 57 toward the disk 52. The outer face of the bolt 55 is notched, as at 58 to receive the end 59 of the operating lever 60, which operating lever is of the bell crank form, and which is pivoted on a stud 61, and has another end 62 adapted to be operated upon the passage of the packet through the machine. This operation is effected through the medium of a second bell crank lever 63 pivoted on a stud 64, one arm of which 65 projects upwardly into the path of a packet, as will be seen, and the other arm of which 66 projects rearwardly and is adapted to engage a ratchet 67, on the end of the lever 62. The ratchet 67 is pressed downwardly by spring 68, so that the lever 62 is operated by the lever 63 when branch 65 is moved rearwardly, and is not operated when branch 65 is moved in the opposite direction. The levers 60 and 63 are pressed in opposite directions by means of a spring 69 between a projection 70 on lever 63 and the lever 60. The end of the lever 60 which engages the bolt 55 is adapted to normally ride in the groove 51' of the member 51, being pressed thereto by means of the spring 69. Further it is wedge shaped as shown, being thus adapted to enter the slot 58 in the bolt 55 upon rotation of the member 51 and remove the bolt from engagement with the teeth 56 on the member 52. A pin 71 extending transversely of the groove 51' is adapted to engage the outer end of the lever 62 and stop the movement of the disk upon disengagement of the bolt 55.

On the opposite side of the member 51 from the member 52 is a pin 72 which may be adjusted to various positions in holes 72' provided for the purpose. By this pin the connecting member 53 is operated. The connecting member 53 is pivoted at its end 73' to the feeding device 34, and is notched adjacent its end 74 to receive the pin 72. The notch is on the underside so that upon rotation of the member 51 the connecting member is moved forwardly and then released as soon as the pin passes out of the notch on its downward movement, and the extreme end 74 is bowed outwardly and positioned to be engaged by an incoming packet and held down so that the notch and pin are held in engagement while the packet is passing over it. The actuator is thus adapted to impart reciprocatory movement to the feeding device 34. By means of the complemental devices aforementioned, this reciprocatory movement is so governed as to feed the stamp strip forward one stamp at a time. The first of these complemental devices comprises a clamping member 75 journaled on the upper end of the feed bed 33 and transversely of the same in such position as to press the stamp strip to the feed bed upon rotation. This rotation is effected by means of the rearward projection 78 which is engaged by a complemental cam projection 79 on the feed pawl 34 upon the extreme forward movement of the same, as shown in Fig. 7. When the pawl moves rearward, the clutch is held in its clamping position by means of friction, which is made suitably great by any suitable means. At the end of its backward stroke the feed pawl releases the clutch by means of an engaging projection 77 which at this point of the stroke engages an operating lever 76 secured to the shaft 75. The stamp strip which was held against forward movement by the clutch during the back stroke of the feeding device 34 is freed for forward movement during the forward stroke. Backward movement is, of course, likewise prevented by means of the clutch member.

The second complemental device consists of an automatic one direction clutch between the feeding device and the shaft 27' on which the same is mounted. It consists of a roller clutch 80, 81 of a form well known in the art, and the roller is socketed in one arm of the pawl to bear on the shaft and clutch the feeding device thereto when the feeding device is drawn to its feed stroke by means of spring 48, Fig. 5. After its release by the actuating mechanism the spring tends to give the pawl a very quick forward movement. Thus the pawl is effectively clutched to the shaft which is rotating in the same direction as the pawl tends to move. Thus the feeding device is given a movement in conformity to the movement of the shaft, and at the end of its forward stroke is automatically unclutched from the shaft, the speed of the shaft then being relatively greater than the speed of the pawl.

The stamp applying and stamp feeding mechanisms of my invention as thus described, will operate to apply stamps to packets feeding to the mechanisms by any suitable feeding mechanism. I prefer to use the means I have shown in my invention in this embodiment and which it will be seen I have combined with the applying and feeding mechanism in a very efficient manner. The rollers of the feeding and moistening mechanisms are arranged with their lines of contact with the packet (which line, of course, is tangent to their peripheries at the point where the packet is engaged) coinciding with the line of contact of the applying rolls 25, 25'. Thus a straight line motion of packet through the machine is secured.

The feeding mechanism comprises the feeding drum 14 and platform 13 aforementioned, together with the rolls 15' and 16'. It also comprises the pivoted weight member 82 adapted to bear upon the top of a pile of packets and hold them in position, and the fixed guard plate 83 in advance of the rolls 15 and 16. The body of the drum 14 is below the platform 13, but its periphery projects a slight distance above it. The drum is provided with grooves 84 and 85 in which are placed rubber feeding bands 86 and 87 below the tops of the grooves. The periphery of the drum, for a short distance however, is cut away as shown at 88, whereby once a revolution, the rubber bands are exposed above the top of the platform and engage the underside of a packet. The packet is thus moved onto the rolls 15' and 16'. The roll 15' revolves counterclockwise as shown by the arrow while the roll 16' revolves in the same direction. Thus the roll 16' will engage the underside of the packet carrying it forward through the machine, while the roll 15' rotating backwardly, tends to carry it backward, but is prevented from so doing by reason of its less width, (see Fig. 1) and acting on the next packet above the packet in engagement with the roll 16' moves that packet backwardly and prevents more than one packet being drawn through the machine at a time. The guard in front of the roll 15' keeps the pile of packets back and in order and assists the roller 15' in its function. The roller 15' is movable up and down by means of the vertically adjustable bearing 89 in order that packets of varying thicknesses may be operated upon.

Between the feeding mechanism just described and the applying means is the moistening mechanism, which mechanism is mounted in part upon the same shaft which carries the actuating mechanism. The moistening mechanism comprises the lower rubber roll 16 mounted on the shaft of the actuating mechanism, and the upper vertical movable metallic roll 15. The surfaces of these rolls are ribbed in the same manner as are the surfaces of the applying rolls 25, 25' and 26, 26' and the upper roll is prevented from rolling in contact with the lower roll by reason of engagement of its adjacent bearing in the bottom of its socket similarly engaged with the bearing 28 in the bottom of its socket. The lower roll 16 runs in contact with a small moistening roller 91 supported in a bracket 91', and which runs in a trough 93 fed by a reservoir 94 connected therewith, and both of the rolls being connected transversely of the casing by suitable means such as sockets 96 and opposed set screws 97.

Engaging across the upper end of the bed plate 33 is a fixed strip 92' carrying a number of forwardly projecting confining pins or guards 92, beneath which the foremost stamp passes, and by means of which said stamp is separated from the packet moving into the applying mechanism to prevent premature sticking of the stamp upon the packet.

Briefly the operation is as follows:—With a stack of envelops or other packets in the position shown in dotted lines in Fig. 3 held down by the weight 82 with their inner ends against the guide 83, the machine may be started in operation by turning the switch shown on the side plate 19 in Figs. 1 and 2. This switch controls the power circuit of the electric motor 18. By means of the chain gearing shown clearly in Figs. 2 and 3 all of the shafts of the machine are rotated in the direction shown by the arrows shown in Fig. 3. As the exposed portion of the rubber bands 87 comes underneath the packet, as shown, it starts that packet by frictional engagement underneath the guide 83 between the feeding rollers 15' and 16' the under one of which tends to carry the envelop rapidly into the machine and the upper one of which strikes back the envelop above it. The lower roller, as heretofore pointed out, is of greater width whereby it gives a greater friction on the under envelop, than the upper roller 15' which is narrower is able to give. Even though only one envelop or packet be between the feeding rollers 15' and 16' that one is fed rapidly inward, while those above it are kept back by the roller 15 in conjunction with the guide 83. The packets being placed on the platform with the address or stamp side down and the stamp edge on the side 20 of the machine as each of them is fed forward by the rollers 15', 16', the packet is projected between the upper and lower moistening rollers 15 and 16, and its under inner edge is moistened all the way across. Revolution of the under roller 16 in contact with the carrier roller 15 dipping into the tank 93 (Fig. 4) is constantly wetting the surface of the roller 16. Passing from the moistening rollers each packet is projected between the stamp applying rollers 25, 25' in connection with which is associated the stamp feeding mechanism. As the packet passes between the rollers 15 and 16 of the moistening mechanism its inner end engages the upper arm 65 of the bell crank lever 63 (Figs. 3 and 7) thus pressing the end of that lever down and through the opposite end of the actuating lever 66 moves the latch 60 from the bolt 55, whereupon the bolt 55 springs into engagement with the right hand clutch member 52 (Fig. 9) and the actuating member 51 is rotated by the member 52. Immediately the pin 72 engages in the notch on the underside of the connecting member 53, and thus carries the pawl 34 backward (Figs. 7 and 8) to the position shown in Fig. 8. As soon as the pin 72 rotates far enough (Fig. 8) it leaves the notch in the member 53, whereupon the member 34 is drawn forwardly by its actuating spring 48 (Fig. 5) But this is not a sudden movement forward, as is usually the case with spring actuated parts. Immediately the forward movement commences, the one direction clutch 80, 81

(Fig. 10) comes into operation and clutches the pawl 34 to the revolving shaft 27. Thus the member 34 is given a uniform movement proportional to that of the shaft 37. Its teeth 47 (Fig. 11) engage in the perforations of the stamp strip, and feed the stamp strip forward, the stamp clutch 75 having been just previously actuated by the projection 77 acting on the lever 76 (Fig. 8) to release the stamp strip. This feeding movement continues until the pawl 34 is stopped by engagement with the end 79 of the clutch member 75, whereupon the stamp strip is clamped to the feed bed (Fig. 10), and the pawl is stopped, the shaft 27' continuing to rotate unimpeded, as will be apparent from inspection of Fig. 10. The stamp strip has thus been fed forward from beneath the confining pins 92 (Figs. 4 and 5) one stamp length, and the endmost stamp is projected between the underside of the passing packet and the bottom roll 25. The stamp is drawn forward by the rolls in contact with the moistened underside of the packet, and the clamp 75 having acted, is torn from the strip, the tearing taking place from the center outwardly by reason of V shaped end 46 of the feed bed. The stamp is thus kept alined with relation to the packet. It is pressed firmly to the packet by the rolls 25, 25', and the packet being finally projected between the rollers 26, 26' additional pressure is imparted to it by these rolls, whereby it is stuck to the packet firmly. Passing from between the rolls 26, 26' it is discharged from the machine and caught in the inverted cover member 93ª pivoted to the rear of the frame members 19 and 20 as shown in Fig. 3 and held in a horizontal receiving position by engagement with the rear side of the stamp roll housing 39. This cover, as shown in dotted lines in Fig. 3, is adapted to cover the upper half of the machine when not in use. By removing the pin 72 from the advance hole 72' and placing it in one of the following ones, the time when the feeding pawl is actuated can be changed with the result that the applied stamp will be positioned on the envelop at a point in the rear of the point where it is positioned when the pin is in the advance hole. By this means packets may be run through the machine once and one stamp applied, the pin changed to another position, and the same packets run through again and a second stamp applied by the side of the first. In a similar manner three or four stamps may be applied to the packet. Suitable means (not shown) may be provided for the ready shifting of the pin 72.

The machine I have described is most efficient in its operation, the cycle described in connection with the single packet being carried out at a rate of 150 packets per minute. The machine is simple and easy to operate, does not get out of order readily and requires but a small amount of power for its operation.

In Fig. 13 I have shown a modification of the feeding mechanism of my machine, which modification I prefer to use in connection with this machine. In Fig. 13 I show the moistening rollers 15 and 16 and the lower feeding roll 14' of the mechanism previously described. But the rollers 15' and 16' intermediate the roller 14 and the rollers 15 and 16 are omitted. Instead a roll 15" is positioned above the roll 14' and made to rotate reversely to the line of contact as shown. The guide 82 is used in connection with this roller, and the weight 83 may also be used in front of the guide if desired. Motion is communicated from the roll 14' to the roll 16 by means of a chain and idler as shown, and an intermediate platform 94 is adapted to guide the packets between roll 14 and the rolls 15 and 16 and prevent contact with the chain and idler. Instead of having rubber friction bands 87 exposed through only a part of their periphery they are exposed through the whole periphery, as clearly shown. Under these conditions the roll 15" serves the same purpose with the roll 14' as the roll 15' serves to the roll 16' in the first form described (Fig. 3). Moreover the roll 15" is made narrower than the combined width of the bands on the roll 14'. The peripheral speed of the roll 16 is made relatively greater than the peripheral speed of roll 14, the revolutions per minute being adjusted as indicated to secure this. By this mechanism one packet at a time is fed forward and a most reliable and efficient action is secured by the mechanism having a minimum number of parts and these parts the simplest possible. This mechanism has not been known to miss a feed or to make a double feed of two envelops at one time.

In combination with the stamp affixing mechanism I provide a rewinding device shown in Figs. 1 and 2. As the stamp rolls are received from the Government, sometimes they are wound in one direction and sometimes in the other, so that as fed from one of these rolls the stamps would be applied to the packets up side down. By having the rewinding device convenient the stamps may be quickly rewound in the right direction. This rewinding device comprises a stud 95 on the side 19 of the frame (Fig. 2) and projecting some distance inwardly from the inner side. Pivoted at the base end of this stud is a supporting arm 96 extending upwardly and pressed toward the operating shaft 27 by a spring 97. At its upper end this arm carries a short transverse shaft 98 on which is mounted a metallic reel 99, the inner flange 100 of which is removable, being secured in position by a simple screw 101. To the outer flange of this reel is secured a frictional gear 102 which bears against a complemental gear 103 keyed to the shaft 27.

The roll of stamps it is desired to rewind is placed upon the free end of the reel 99 and its outer end entered into the drum of the reel 99. Upon starting the motor which operates the stamp affixer, the roll of stamps is rapidly wound upon the reel. During this rewinding operation of course the stamp affixer mechanism is not operated, since there are not packets passing through the machine. Upon completion of the rewinding operation the stamp roll may be removed by removing the side of the reel 99, whereupon the roll may be placed on the stud within the housing 39 of the feeding mechanism.

It is to be noted that in connection with this housing the securing link 40 is adapted to receive a small padlock whereby the roll of stamps is locked up in the housing and theft is prevented.

While I have described the best form of my invention now known to me I desire to have it understood that my invention may be given many forms by those skilled in the art without departing from its generic spirit. Therefore I desire to cover in the annexed claims all such forms of my invention.

Having thus described the invention what is claimed as new is:—

1. A machine of the character described comprising a stamp applying mechanism, a stamp feeding mechanism, a continuously rotating clutch part, a co-acting clutch bolt for said clutch part, and an operating lever having one end normally engaging the bolt to hold the same in inoperative position, the opposite end of the lever being arranged for engagement with packets passing through the machine to intermittently release the lever from the bolt.

2. A machine of the character described comprising a stamp applying mechanism having a rotating applying roll, and a feeding mechanism comprising a segmental concentric bed plate over which a perforated strip of stamps passes to said applying roll, and an oscillatory feeding pawl having teeth bearing against the strip and adapted to drop into engagement with the perforations thereof.

3. A machine of the character described comprising a stamp applying means and a feeding mechanism, said feeding mechanism comprising a fixed feed bed adjacent to the applying means and over which a strip of connected stamps is fed, means for supporting the strip of stamps in roll form with its end projecting over said bed in proximity to said applying means, a reciprocating feed device for feeding said strip over said bed, a clutch which holds the free end of the strip during the backward stroke of the feeding device, and means whereby said clutch is operated to release the free end and permit the forward feeding movement of the strip by the feed device upon the completion of the backward stroke.

4. A machine of the character described comprising a stamp applying mechanism, a stamp feeding device comprising a feed bed adjacent said applying means and over which a strip of connected stamps is fed, means for supporting the strip of stamps in roll form with its end projecting over said bed in proximity to said applying means, a reciprocating feeding device, and a clutch operable by the feed device to hold the end of the strip of stamps during backward stroke of the feeding device and to release the stamp strip to permit its being fed forward by the feeding device upon the end of the backward stroke.

5. A machine of the character described comprising a stamp applying means adapted to simultaneously draw in a stamp and a packet, and a stamp feeding means, said feeding means comprising a feed bed adjacent said applying means and over which a strip of connected stamps is to be fed, one stamp at a time to said applying means, means for supporting the strip of stamps in roll form with its end projecting over said bed in proximity to said applying means, a feeding device for projecting the stamps over said bed, the advance end of said feed bed being raised in the middle to arch upwardly the middle of the stamp-strip, and a gripping device binding the next adjacent end stamp against said feed plate to tear off the end stamp.

6. A machine of the character described comprising stamp applying rollers, a stamp feeding means comprising a feed bed adjacent said applying rollers and over which a strip of stamps is to be fed, means for supporting the strip of stamps with its end projecting over said bed in proximity to said applying rollers, and means for moving said stamps over said bed one stamp at a time, the end of said bed adjacent said applying rollers being raised in the middle and extending at an angle to the line of contact of the said applying rollers.

7. A machine of the character described comprising a stamp applying means, a stamp feeding means, said feeding means comprising a feed bed adjacent said applying means and over which a strip of connected stamps is fed to said applying means, means for supporting the strip of stamps with its end projecting over said bed in proximity to said applying means, a feeding device for projecting the stamps over said bed, means for feeding packets to the means, means for moistening the packets on the side adjacent said stamp strip feed mechanism, and guards above said feed bed adjacent said applying means for preventing premature contact of the packets with the stamps.

8. A machine of the character described comprising a stamp applying means, and a stamp feeding means, said feeding means comprising a feed bed adjacent said applying means over which a strip of connected stamps is fed, means for supporting the strip with its end projecting over said bed in proximity to said applying means, a reciprocating device, a part having a uniform movement, and an automatic one direction clutch between said part and the reciprocating device whereby said reciprocating device is compelled to travel in conformity with the movement of said part.

9. In a machine of the character described, a stamp-applying means, a bed plate arranged adjacent to said applying means, a pawl operable against the bed plate and having independently-mounted spring-actuated teeth adapted for engagement in the perforations of a stamp-strip to move the latter over the bed-plate, said teeth being so arranged as to engage some of the same in the perforations and others between other perforations to admit of the lateral play of the stamp-strip, and intermittently operating means for the pawl.

10. In a machine of the character described, a stamp-applying means having a roller, a stamp-feeding means having a roller bearing against and coöperating with the roller of said applying means, a bed-plate concentric with said second roller and adapted to receive a stamp-strip thereover, a pawl concentric to the bed-plate and having a plurality of teeth engaging with the strip to feed the same over the bed-plate, said bed-plate having a raised central portion at its upper extremity to arch upwardly the middle portion of the stamp-strip at the juncture between the two end stamps, the end stamp being adapted for engagement between the coöperating rollers for movement into the applying means, and a gripping device binding the strip upon the bed plate simultaneously with the inward movement of the end-stamp into the applying means to tear the stamp from the strip.

11. In a machine of the character described, a stamp-applying means having a roller, a stamp-feeding means having a second roller coöperating with the first roller, a bed-plate concentric to the second roller and adapted to receive a stamp-strip thereover for engagement between the rollers, a pawl operable against the bed plate to feed the strip intermittently into the rollers one stamp at a time, means carried by the bed plate for raising the stamp-strip at the juncture of the end stamps to provide a tearing edge, and a gripping device operable simultaneously with the movement of the end-stamp to the rollers for binding the strip from movement against the bed-plate whereby the end stamp is torn from the strip.

12. In a machine of the character described, a bed plate adapted to slidably receive a perforated stamp strip, intermittent gripping means for the strip to hold the same from movement over the bed plate, a packet feeding means for conveying a packet past the bed plate and against the end stamp, the end stamp being adapted to adhere to the packet, and a stamp applying means for drawing the packets and the stamps away from said plate simultaneously with the grip of the strip, a bed plate having a raised portion adapted to bend the stamp strip out of its plane at a point adjacent the end stamp, whereby the latter may be readily torn from the strip.

13. In a machine of the character described, a packet feeding means, a stamp strip feeding means, gripping means for the stamp strip to hold the same from movement, a bulging device for the stamp strip to raise the central portion of the same out of the plane of the strip, and a stamp applying mechanism receiving the packet and the stamp strip and tearing a stamp from the strip, when the latter is engaged by the gripping means.

In testimony whereof I have hereunto set my hand in presence of two subscribing witnesses.

JOHN A. MARKOE.

Witnesses:
F. A. PIKE,
A. D. McLEODE.